March 26, 1963          A. C. VOGEL          3,082,748
FLUID PRESSURE POWERED PISTON MOTOR
Filed Dec. 16, 1960          2 Sheets-Sheet 1
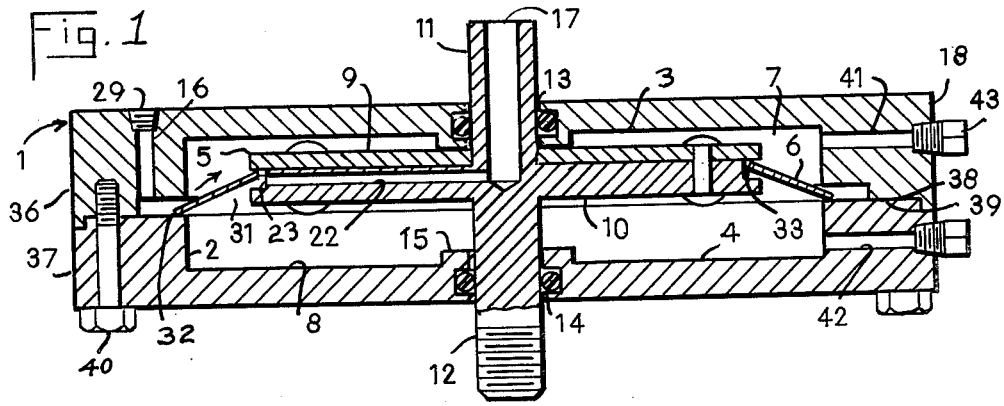
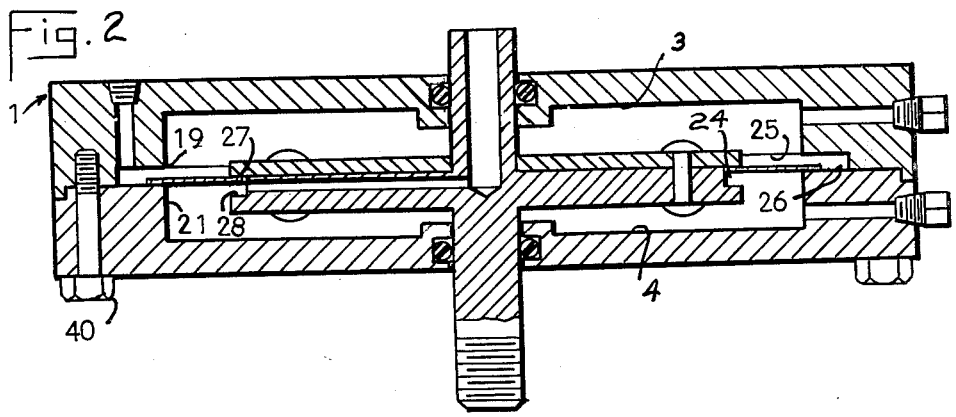
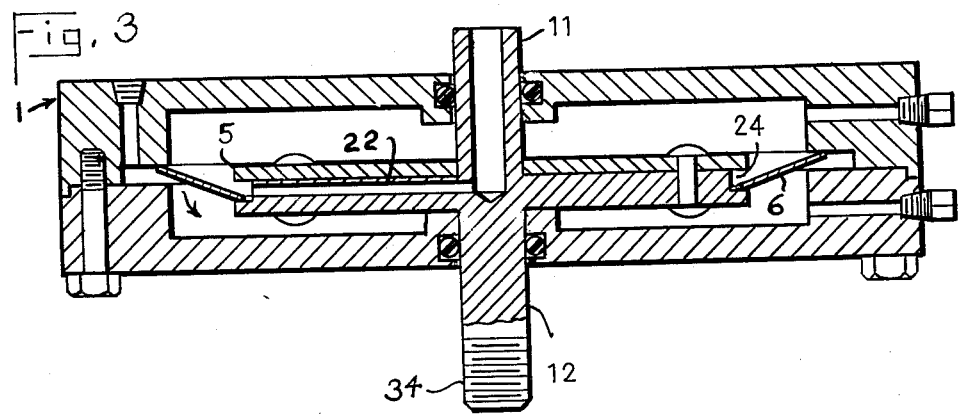
INVENTOR.
ARTHUR C. VOGEL
BY *Nicholas J. Garofalo*
His Attorney

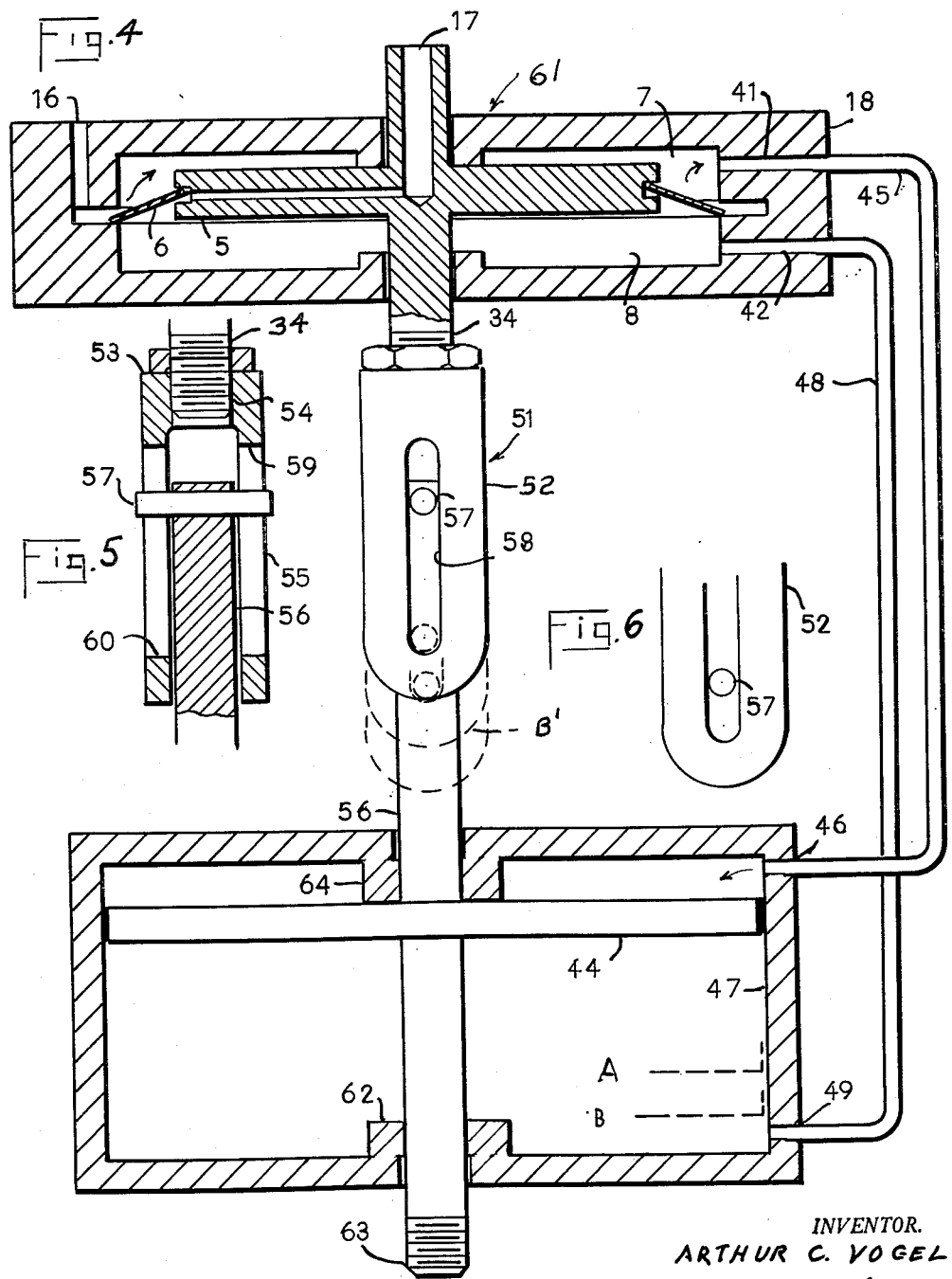

United States Patent Office 3,082,748
Patented Mar. 26, 1963

3,082,748
FLUID PRESSURE POWERED PISTON MOTOR
Arthur C. Vogel, 15 Glen Keith Road, Glen Cove, N.Y.
Filed Dec. 16, 1960, Ser. No. 76,336
7 Claims. (Cl. 121—123)

This invention relates to new and advantageous improvements in fluid pressure powered piston motors.

An object of this invention is to provide a fluid pressure powered piston motor wherein the piston has a short range of travel and is adapted upon application of fluid pressure thereto to automatically communicate opposite ends of its cylinder alternately with a fluid pressure inlet and with a vent so as to cause the piston to continuously oscillate.

A feature of the invention lies in the structure of the piston cylinder whereby a single inlet is utilized to alternately serve opposite ends of the cylinder with fluid pressure.

A further feature of the invention lies in the structure of the piston whereby a passage formed in the latter is utilized to alternately vent opposite ends of the piston cylinder of spent fluid.

Another feature of the invention lies in the association with the piston of an unstable conical disc spring which is supported between the piston and the surrounding wall of the piston cylinder, and which spring is adapted as the piston moves to be collapsed to its reversed condition. The spring functions as it is collapsed from one condition to its reverse condition to communicate by means of its outer peripheral edge the inlet alternately with opposite ends of the piston cylinder, and to communicate by means of its annular inner edge opposite ends of the cylinder alternately with vent.

The device of the present invention has a wide range of uses. For example, the continuously oscillating piston thereof may be utilized to repeatedly make and break an electrical circuit; raise and lower a lever; actuate a reciprocating pump; etc.

A further object of this invention is to provide a device which may be used, as desired, either as a fluid pressure powered piston motor; or as a valve in association with an externally located work piston to supply the latter continuously with operating fluid pressure.

The invention further lies in the construction and particular arrangement of the various elements thereof, as well as in the cooperative association of these elements with one another to effect the results intended herein.

The foregoing features, objects, and advantages of this invention will appear more fully hereinafter from a consideration of the detailed description which follows, taken together with the accompanying drawings wherein an embodiment of the invention is illustrated. It is to be expressly understood, however, that the drawings are for purposes of illustration and description, and they are not to be construed as defining the limits of the invention.

In the drawings:

FIG. 1 is a sectional view in elevation showing a fluid pressure powered piston motor embodying my invention, and showing the device in an initial position;

FIG. 2 is a view similar to that of FIG. 1, but shows the piston as having been moved to its intermediate position just prior to the point at which the associated unstable spring snaps through center;

FIG. 3 is a view similar to that of FIG. 1, but shows the position of the piston and spring after the latter has snapped to its reverse position;

FIG. 4 shows the device of FIG. 1 in association with an externally located work piston;

FIG. 5 is a detail in section of the pin and slot structure; and

FIG. 6 shows the clevis member of the pin and slot structure in its lowermost position.

For a more detailed understanding of the invention reference is directed to the several figures of the drawing, and is now directed especially to FIGS. 1 to 3. In the latter figures there is disclosed a housing 1 having a hollow interior defining a piston cylinder 2. The latter is closed over by parallel horizontal end walls 3 and 4. A piston 5, together with an annular spring 6 supported between the piston and the interior wall of the cylinder, divide the latter into a pair of sub-chambers 7 and 8.

The piston is a disc of lesser diameter than that of the piston cylinder. It has flat end faces 9 and 10. Extending axially in opposite directions from the piston is a pair of piston shafts 11 and 12, hereof cylindrical form; each of which extends with a slide fit through a hole 13 formed axially of the corresponding end wall of the cylinder. An O-ring 14 seated in each end wall seals the related end of the cylinder against leakage about the related piston shaft. The piston is reciprocable in the cylinder between the end walls 3 and 4, and has a short range of reciprocating movement. A boss 15 formed on each end wall about the corresponding piston shaft acts as a stop limiting the extent of movement of the related end of the piston, and also serves to provide a space between the major portion of the end face of the piston and the related end wall.

The piston is reciprocable in its cylinder in response to fluid pressure supplied alternately to the opposite ends or sub-chambers 7 and 8 thereof. The fluid pressure is supplied through a single inlet port 16, which is adapted to serve both sub-chambers. During reciprocation of the piston spent fluid escapes through an outlet or vent 17, which is also adapted to serve both sub-chambers.

The inlet extends longitudinally into the side wall 18 of the cylinder, and it communicates with the peripheral end of an annular inlet channel 19 formed around the interior wall 21 of the cylinder. The inlet channel extends preferably about the mid-point of the cylinder. The outlet or vent 17 extends axially into one of the piston shafts, here shaft 11; and it communicates with a bore 22 extending radially through the body of the piston. Bore 22 opens radially through the back wall 23 of an annular vent channel 24 formed around the periphery of the piston. It is to be noted that the vent 17 is substantially greater in diameter than the radial bore 22; and while a single bore 22 suffices to vent the sub-chambers of spent fluid during operation of the piston, it is to be understood that a plurality of bores 22 may be formed in the piston to communicate with the vent 17. The opposed annular walls 25 and 26 of the inlet channel, as well as the opposed annular walls 27 and 28 of the vent channel are in parallel relation to each other, and they are also in parallel relation to the end walls 3 and 4 of the cylinder 2. The outer end 29 of the inlet is adapted for connection to a suitable source, not shown, of pressure fluid, such as air.

The spring 6 serves as a valve which functions to allow flow of live or operating fluid, such as air, from the inlet channel 19 alternately to the sub-chambers 7 and 8 to cause reciprocation of the piston. It also functions as a valve to allow spent fluid to escape alternately from the sub-chambers through the vent channel 24 so as to prevent the spent fluid from becoming trapped in the sub-chambers and thereby resisting movement of the piston.

The spring 6 has an annular body 31 which is dished or coned, as appears in FIGS. 1 and 3. It is of a dished washer type. It is unstable and is adapted under loading in one direction to collapse and snap through center from a position as in FIG. 1 wherein the coned end thereof faces in one direction, to a position as in FIG. 3 wherein the coned end faces in the opposite direction. It requires loading in the opposite direction to return the spring to its original position. The spring has a short range of movement as it collapses through center from one position to the other.

At rest, the piston has one of two positions. It is either in light contact with the end face of the boss 15 of sub-chamber 7, as in FIG. 1; or it is in light contact with the end face of boss 15 of sub-chamber 8, as in FIG. 3. In either of these two positions, the outer peripheral edge 32 of the spring extends into the inlet channel 19 and therein presses or seats against one of the annular walls 25 and 26 and is clear of the other, so that the inlet channel 19 is in communication with one of the sub-chambers 7 and 8 and is closed off by the body of the spring from the other. And in either of these two positions of the piston the inner annular edge 33 of the spring extends into the vent channel 24 and therein presses or seats against one of the annular walls 27 and 28 and is clear of the other, so that the vent channel is in communication with one of the sub-chambers 7 and 8 and is closed off by the body of the spring from the other. The wall of the inlet channel which will be engaged by the peripheral edge of the spring will always be opposite to that wall of the vent channel which will be engaged by the inner edge of the spring; so that when the piston is at rest or at one end of the cylinder, one of the sub-chambers will be in communication with the inlet 16 and closed from the vent 17, and the reverse condition will exist with respect to the other sub-chamber.

In describing the operation of the device, let it be assumed that the piston has the initial position shown in FIG. 1. Pressure fluid then admitted through the inlet 16 flows from the inlet channel 19 to the sub-chamber 7. The fluid pressure acts upon the upper faces of the piston and spring, causing the piston and spring to move downward. As the latter action occurs, the spring is compressed to an intermediate position, substantially flat, as appears in FIG. 2. Upon reaching the latter position the spring snaps through center and moves with the piston abruptly to the position shown in FIG. 3. As the spring snaps through center from the FIG. 2 position the contacting relation of the peripheral and inner edges of the spring with the corresponding walls of the inlet and the vent channels is reversed. As a consequence of the latter action sub-chamber 7 is closed to the inlet and is open to vent, permitting escape of spent fluid through the latter; and the reverse condition exists in sub-chamber 8. Operating fluid then flowing to the latter acts on the piston and spring to cause the piston and spring to return to their original position, as in FIG. 1.

It can be seen that by maintaining a continuous flow of pressure fluid to the inlet 16 the piston 5 will continuously reciprocate or oscillate in the cylinder 2 as the sub-chambers 7 and 8 are alternately supplied with pressure fluid and vented of spent fluid. It is also obvious that either or both ends of the piston shafts 11 and 12 may be utilized for a work operation. Here, the shaft 12 is adapted by a threaded end 34 for driving connection with a suitable tool or other device, not shown, which may be a timer, a lever, a reciprocating pump, etc.

To facilitate assembly of the device and replacement of its component parts, the housing 1 is formed of a pair of shells 36 and 37, each having broad complementary annular end faces 38 and 39 adapted for mating engagement to define the piston cylinder 2. A ring of bolts 40 serves to hold the shells in air-tight engagement with one another to define the housing 1.

It is to be further noted that a port 41 extends from the sub-chamber 7 through the wall 18 of the housing; and that a similar port 42 extends from the sub-chamber 8 through the wall 18. A separate plug 43 normally stoppers each of these ports. By using the ports 41 and 42 the piston 5 and spring 6 may be utilized as a short range moving valve unit, as appears in FIG. 4, to supply operating fluid to opposite ends of an externally located work piston 44 having a relatively longer range of movement than piston 5. In the arrangement shown in FIG. 4 a conduit 45 connects port 41 with a port 46 leading into the upper end of a cylinder 47 in which the work piston 44 reciprocates. A second conduit 48 connects port 42 with a port 49 leading into the opposite end of the work cylinder 47. A pin and slot structure 51 comprises a clevis member 52, the bridge end 53 of which has an axial hole 54 in which the threaded end 34 of piston 5 is threadedly engaged. The threaded end 34 is sufficiently extended to enable adjustment of the clevis 52 further up or down thereon, as may be desired. Slidably received between the depending arms 55 of the clevis is an end portion of a shaft 56 of the work piston. The latter shaft carries in its upper end a diametrically extending pin 57, the external end portions of which project with a slide fit through a pair of opposed elongated parallel slots 58 formed longitudinally of the arms of the clevis. The opposed ends 59 and 60 of the slots limit the range of sliding movement of the pin 57.

The arrangement shown in FIG. 4 operates as follows. Pressure fluid entering the inlet 16 of the device generally designated 61 is caused to flow alternately to the sub-chambers 7 and 8. Assuming the apparatus has the initial position as shown in FIG. 4, pressure fluid, such as air, entering the inlet 16 flows through the sub-chamber 7 and conduit 45 to the upper end of the work sylinder 47. The work piston is adapted to be moved by a relatively lower pressure than is required to shift the piston 5. Accordingly, the work piston is driven downward by the pressure of fluid entering the work cylinder through the conduit 45. As the work piston moves down it carries the shaft 56 and the pin 57 down with it relative to the clevis slots 58 until the clevis pin 57 abuts the lower ends 60 of the slots. Up to this time the piston 5 has not moved, whereas the work piston has moved to broken line position A. As the work piston next moves down further to the broken line position at B, it draws the clevis down to the broken line position at B′ and carries the piston 5 down to the intermediate position shown in FIG. 2. When the work piston is in the B position, it is slightly above the boss 62. Whereupon slight further movement of the work piston causes the spring 6 to snap through center to the position shown in FIG. 3. In this latter action, since the work piston is limited by the boss 62 from further downward movement, the clevis drops relative to the shaft 56 and the clevis pin 57 to the position shown in FIG. 6. Air trapped below the downwardly moving work piston is vented over the conduit 48 and sub-chamber 8 through the vent 17. Due to the shifting of the spring 6, pressure fluid entering the inlet 16 now flows through the sub-chamber 8 and the conduit 48 to act upon and return the work piston and the piston 5 to their original positions.

Continuous flow of pressure fluid through the inlet 16 will cause continuous reciprocation of the work piston. The latter has an externally threaded lower shaft 63 adapted for driving engagement with a suitable tool, not shown, such as the tools earlier mentioned, and other innumerable devices.

If desired, the pin and slot structure 51 may be omitted from the arrangement in FIG. 4. In the operation of the device as so modified, the work piston moves downward until it is arrested by the boss 62, whereupon pressure sufficient to operate piston 5 then builds up in the sub-chamber 7 to cause the piston 5 to move downward and to cause the spring 6 to snap through center. The reverse action takes places as the work piston is caused to move up and limit against an upper boss 64 arranged in manner similar to that of boss 62.

While an embodiment of the invention has been illustrated and described in detail, it is to be expressly understood that the invention is not limited thereto. Various changes may be made in the design and arrangement of the parts without departing from the spirit and scope of the invention, and it is my intention, therefore, to claim the invention not only as shown and described but also in all such forms and modifications thereof as may reasonably be construed to fall within the spirit of the invention and the scope of the appended claims.

What is claimed is:

1. A fluid pressure powered oscillating piston motor comprising a piston cylinder having a head closing each end thereof, a pressure fluid inlet opening into the cylinder through the central area of the side wall of the cylinder, a piston oscillable in the cylinder in response to an uninterrupted flow of pressure fluid from the inlet being caused to flow alternately to opposite ends of the cylinder, a piston rod extending axially from an end of the piston and projecting with a slide fit through a head of the cylinder, a vent passage through the rod to the piston and communicating radially through the periphery of the piston with the cylinder, an unstable conical spring disc valve supported between the periphery of the piston and the central area of the surrounding cylinder wall, the spring disc having a first condition communicating the inlet with one end of the cylinder and communicating the opposite end of the cylinder with the vent passage, the spring disc having a collapsed second condition wherein the communication of the inlet and vent passage with said ends of the cylinder is reversed, the spring disc in its first condition biasing the piston toward one end of the cylinder, the spring disc in its second condition biasing the piston toward the opposite end of the cylinder, and the spring disc being collapsible through center from one condition to the other as the piston is oscillated by pressure of fluid caused to flow from the inlet alternately to opposite ends of the piston cylinder as a consequence of the changing conditions of the spring disc.

2. A fluid pressure powered oscillating piston motor as defined in claim 1, wherein a peripheral groove having a pair of opposed annular parallel walls is formed around the periphery of the piston, the vent passage communicates radially with the back of the groove, and the conical spring disc has an inner edge projecting into said groove and having in the first condition of the spring disc contact with one of the annular walls of the groove whereby the vent passage is in communication with one end of the cylinder and is blocked off from the other; wherein an annular groove is formed about the central area of the side wall of the cylinder having a pair of opposed parallel annular walls, the inlet communicates with the back of the annular groove, and the spring disc has a peripheral edge projecting into the annular groove having in the first condition of the spring disc contact with one of the annular walls thereof whereby the inlet is in communication with the opposite end of the cylinder and blocked off from the other; and wherein the relation of the inlet and vent passage to the ends of the cylinder is the reverse when the spring disc is in its second condition in which condition the peripheral and inner edges of the spring disc respectively contact the opposite walls of their respective grooves.

3. A fluid pressure powered oscillating piston motor as defined in claim 1, wherein a second piston rod extends from the opposite end of the piston and has a fluid tight slide fit through the corresponding head of the cylinder, and has an externally projecting end adapted for connection with a tool.

4. A fluid pressure powered oscillating piston motor as defined in claim 1, wherein the cylinder has a pair of outlet ports, one in communication with one end of the cylinder and the other in communication with the other end of the cylinder, a separate plug normally closes each outlet port, and the outlet ports being adapted upon removal of the plugs to be connected to opposite ends of an external work piston cylinder.

5. A fluid pressure powered oscillating piston motor as defined in claim 1, wherein the cylinder has a pair of outlet ports each in communication with a separate end of the cylinder, the combination with said motor of an externally located work cylinder having a work piston reciprocable therein in response to pressure fluid admitted alternately to opposite ends of the work cylinder, conduit means connecting one of the outlet ports with one end of the work cylinder, and other conduit means connecting the other outlet port with the opposite end of the work cylinder.

6. A fluid pressure powered oscillating piston motor as defined in claim 5, wherein the piston has a second piston rod projecting through the opposite end of the cylinder, the work piston has a piston rod projecting through the work cylinder and axially aligned with the said second piston rod, and means engaging the latter rod with the work piston rod for movement of both as a unit.

7. A fluid pressure powered oscillating piston motor including a housing having a piston chamber, a pressure fluid inlet port to the chamber opening through the central area of the side wall of the chamber, a piston workable in the chamber, and means for causing the piston to oscillate in the chamber in response to an uninterrupted flow of pressure fluid through the inlet to the chamber; said means comprising an annular groove in the side wall of the chamber having its back area in communication with the inlet port, a piston having a clearance between it and the surrounding wall of the chamber, a piston rod extending axially from the piston and projecting with a fluid tight slide fit through an end wall of the chamber, a peripheral groove about the center of the piston, a vent passage extending through the piston rod to the piston and opening radially out of the piston rod through the back wall of the peripheral groove, and an unstable coned disc collapsible through center to a reverse condition under the influence of a predetermined pressure applied thereto, the coned disc having an inner diameter edge extending into the peripheral groove of the piston and having an outer diameter edge extending into the annular groove of the chamber, the coned disc having a first condition wherein an outer marginal undersurface thereof seats upon a lower annular edge of the annular groove to block flow of inlet fluid to one end of the piston chamber and not to the other, and wherein an inner marginal opposite surface of the coned disc seats against an upper annular edge of the peripheral groove to block off communication of the opposite end of the piston chamber with the vent passage, and wherein the condition of the coned disc relative to the inlet and vent passages is reversed to a second condition after the coned disc has been collapsed through center.

References Cited in the file of this patent

UNITED STATES PATENTS

| | | |
|---|---|---|
| 1,879,365 | Lombard | Sept. 27, 1932 |
| 2,169,541 | Smith | Aug. 15, 1939 |
| 2,246,621 | Davis | June 24, 1941 |
| 2,370,068 | Palm | Feb. 20, 1945 |
| 2,699,152 | Russell | Jan. 11, 1955 |
| 2,893,416 | Hegstad | July 7, 1959 |
| 2,923,309 | Allen | Feb. 2, 1960 |